(12) United States Patent
Morita et al.

(10) Patent No.: US 10,291,157 B2
(45) Date of Patent: May 14, 2019

(54) CONTROLLER FOR ELECTRIC ROTATING MACHINE THAT INTERRUPTS A CURRENT FLOW TO AN INVERTER

(71) Applicant: DENSO CORPORATION, Kariya, Aichi-pref. (JP)

(72) Inventors: Tetsuo Morita, Kariya (JP); Shinsuke Kawazu, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/483,229

(22) Filed: Apr. 10, 2017

(65) Prior Publication Data

US 2017/0294854 A1 Oct. 12, 2017

(30) Foreign Application Priority Data

Apr. 8, 2016 (JP) .................................. 2016-078233

(51) Int. Cl.
*H02P 3/00* (2006.01)
*H02P 3/08* (2006.01)
(Continued)

(52) U.S. Cl.
CPC ................. *H02P 3/08* (2013.01); *B60K 6/26* (2013.01); *F02N 11/0862* (2013.01);
(Continued)

(58) Field of Classification Search
CPC .......................... B60K 2006/268; B60K 6/26; B60Y 2200/92; B60Y 2300/192; B60Y 2400/60;
(Continued)

(56) References Cited

U.S. PATENT DOCUMENTS 8,054,017 B2 * 11/2011 Baba .......................... H02P 6/21
318/400.11
2009/0289586 A1 * 11/2009 Baba .......................... H02P 6/18
318/400.11

(Continued)

FOREIGN PATENT DOCUMENTS

JP 2005-065389 A 3/2005
JP 2007-028694 A 2/2007

*Primary Examiner* — Abdullah A Riyami
*Assistant Examiner* — S. Mikailoff
(74) *Attorney, Agent, or Firm* — Oliff PLC

(57) ABSTRACT

A control apparatus includes a first determination section determining whether a power-supply voltage has decreased below a first threshold value, an interruption section interrupting a current flow to an inverter if the voltage has decreased below the first threshold value, a second determination section that determining whether the power-supply voltage has increased above a second threshold value, an interruption releasing section releasing the interruption based on the fact that the voltage has increased above the second threshold value, a count section counting the number of interruptions, a limiting section determining whether the decrease in the power-supply voltage is caused by a first factor of an electric rotating machine or a second factor, and limits the counting if the decrease in the power-supply voltage is caused by the second factor, and a third determination section determining whether the interruption is allowed to be released based on the number of interruptions.

6 Claims, 6 Drawing Sheets

(51) Int. Cl.
  *B60K 6/26* (2007.10)
  *F02N 11/08* (2006.01)
  *F02N 11/10* (2006.01)
  F02N 11/00 (2006.01)
  F02N 11/04 (2006.01)

(52) U.S. Cl.
  CPC ........ *F02N 11/10* (2013.01); *B60K 2006/268* (2013.01); *B60Y 2200/92* (2013.01); *B60Y 2300/192* (2013.01); *B60Y 2400/60* (2013.01); *B60Y 2400/61* (2013.01); *F02N 11/006* (2013.01); *F02N 11/04* (2013.01); *F02N 11/0814* (2013.01); *F02N 11/101* (2013.01); *F02N 2011/0896* (2013.01); *F02N 2200/063* (2013.01); *F02N 2250/02* (2013.01); *F02N 2300/2011* (2013.01); *Y10S 903/906* (2013.01)

(58) Field of Classification Search
  CPC .... B60Y 2400/61; F02N 11/006; F02N 11/04; F02N 11/0814; F02N 11/0862; F02N 11/10; F02N 11/101; F02N 2011/0896; F02N 2200/063; F02N 2250/02; F02N 2300/2011; H02P 3/08; Y10S 903/906
  See application file for complete search history.

(56) References Cited

U.S. PATENT DOCUMENTS

2012/0022738 A1* 1/2012 Kato ..................... H02J 5/00
  701/22
2012/0089290 A1* 4/2012 Kato ..................... B60K 6/365
  701/22

* cited by examiner

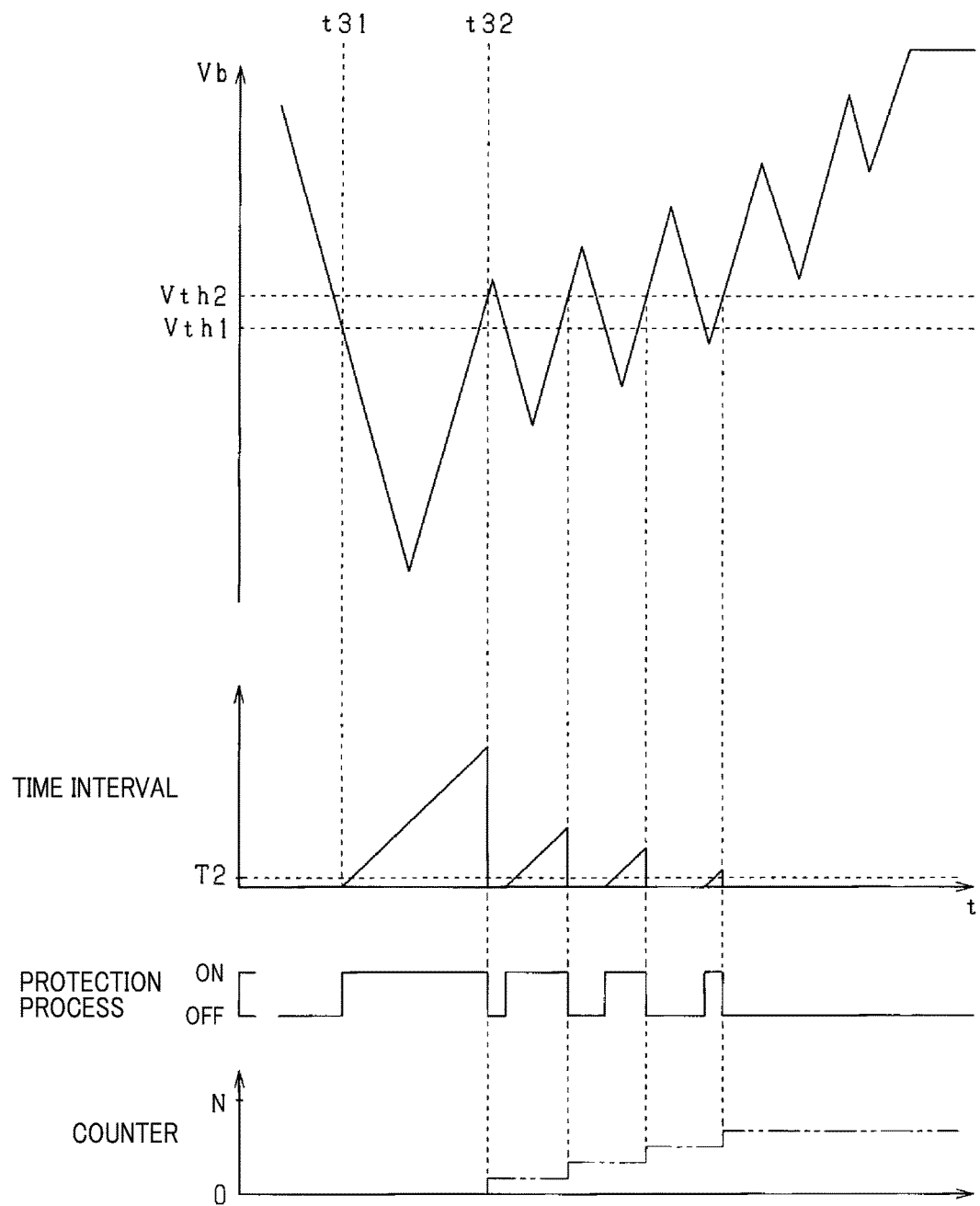

CONTROLLER FOR ELECTRIC ROTATING MACHINE THAT INTERRUPTS A CURRENT FLOW TO AN INVERTER

CROSS-REFERENCE TO RELATED APPLICATION

This application is based on and claims the benefit of priority from earlier Japanese Patent Application No. 2016-78233 filed Apr. 8, 2016, the description of which is incorporated herein by reference.

BACKGROUND (Technical Field)

The present invention relates to a control apparatus for an electric rotating machine.

(Related Art)

For example, there are vehicles in which idling stop control is performed to reduce fuel consumption and exhaust gas. To perform the idling stop control, the configuration including an electric rotating machine (motor generator), a so-called ISG (Integrated Starter Generator), that can perform power generation and power running is in practical use. The ISG has an inverter and a motor section, and performs electric power control for power generation or power running by turning on and off switching elements of the inverter.

A fail-safe technique is known which stops gate control for switching elements performed by a controller of an ISG and forcibly shifts the function of the ISG to power generation only, when an abnormality has occurred in the controller of the ISG (JP-A-2005-65389).

For example, when a short circuit abnormality has occurred in an inverter due to, for example, an on failure of a switching element, an overcurrent flows through switching elements of upper and lower arms. Due to this, there is a concern that the switching elements may be damaged. Hence, when such a short circuit abnormality has occurred, a process for turning off all the switching elements of the inverter is performed as a protection process. In addition, when a short circuit abnormality has occurred, the power-supply voltage of the inverter decreases. Hence, typically, whether or not the power-supply voltage has decreased is determined, and the protection process is performed based on the result of the determination.

However, a power-supply line leading to a battery is considered to be connected to an electric load other than the ISG. A decrease in the power-supply voltage may be caused due to, in addition to the short circuit abnormality in the ISG, voltage fluctuation due to the driving of the electric load. In this case, according to known techniques, the protection process for the ISG is performed regardless of whether the decrease in voltage is caused due to the ISG or a factor other than the ISG. Hence, when the decrease in voltage is caused due to a factor other than the ISG, and the protection process for the ISG is not essentially required, there is a concern that power running and power generation functions may be unnecessarily lost due to the protection process.

SUMMARY

An embodiment provides a control apparatus for an electric rotating machine. The apparatus can properly operate and protect an electric rotating machine when power-supply voltage decreases.

As an aspect of the embodiment, a control apparatus for an electric rotating machine is provided. The apparatus is applied to a power-supply system including an electrical load connected to a current flow path leading to a power supply unit and the electric rotating machine having an inverter connected to the current flow path and a motor section. The apparatus includes: a first determination section that determines whether a power-supply voltage, which is a voltage of the power supply unit, has decreased below a first threshold value; a current flow interruption section that interrupts a current flow to the inverter if the first determination section determines that the power-supply voltage has decreased below the first threshold value; a second determination section that determines whether or not the power-supply voltage has increased above a second threshold value after the current flow interruption section interrupts the current flow; an interruption releasing section that releases the interruption based on the fact that the power-supply voltage has increased above the second threshold value; a count section that counts the number of the interruptions by the current flow interruption section; a limiting section that determines whether the decrease in the power-supply voltage is caused by a first factor of the electric rotating machine or a second factor other than the first factor, and limits the counting by the count section if the decrease in the power-supply voltage is caused by the second factor; and a third determination section that determines whether or not the interruption is allowed to be released by the interruption releasing section based on the number of the interruptions.

BRIEF DESCRIPTION OF THE DRAWINGS

In the accompanying drawings:

FIG. 6 is a timing diagram illustrating control performed at the time of starter cranking according to the second embodiment.

DETAILED DESCRIPTION OF THE PREFERRED EMBODIMENTS (First Embodiment)

Figure 1:
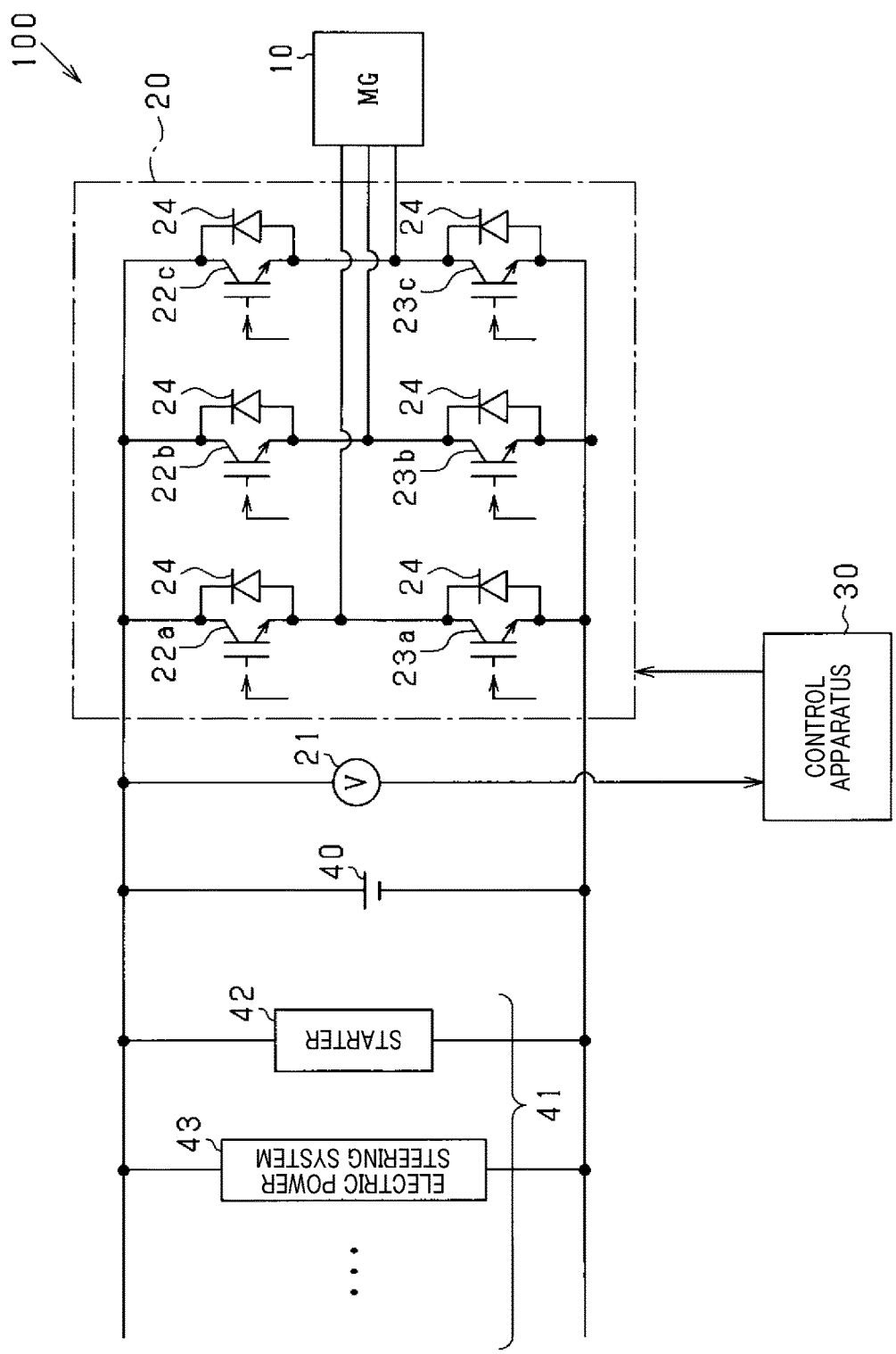
FIG. 1 is a diagram schematically showing a configuration of an engine control system.

Hereinafter, an embodiment embodying a control apparatus for an electric rotating machine will be described with reference to the drawings. In the present embodiment, a power-supply system installed in a vehicle is embodied. FIG. 1 shows a general schematic configuration of the system.

As shown in FIG. 1, an ISG 100 includes a control apparatus 30 that controls a motor section 10 and an inverter 20. The ISG 100 configures a winding field type electric rotating machine having multi-phase windings, specifically, a winding field type synchronous electric rotating machine having three-phase windings. The ISG 100 has functions of power generation and power running driving, and has a configuration into which functions of a starter and an alternator are integrated. The ISG 100 has a starter function of applying initial rotation to an engine output shaft in a vehicle including an idling stop function when the engine restarts after it automatically stops. The ISG 100 may further have a torque assist function of applying torque to an engine output shaft to accelerate the vehicle.

The motor section 10 is connected to a battery 40, which is a DC power supply unit. The output voltage of the battery 40 is, for example, 12 V. The current flow path leading to the battery 40 is connected with, in addition to the ISG 100, electrical loads 41 installed in the vehicle. The electrical loads 41 include a starter 42, which is a starting device for the engine, an electric power steering system 43, lamps, and a car stereo system. The current flow path of the battery 40 is connected with a voltage sensor 21 that detects a battery voltage Vb, which is the voltage of the battery 40.

In the inverter 20, three serial connection bodies of high-potential-side switching elements 22a, 22b, and 22c (upper arm switches) and low-potential-side switching elements 23a, 23b, and 23c (lower arm switches) are connected in parallel. The connecting point of the upper arm switch and the lower arm switch of each phase is connected with a corresponding phase of the motor section 10. Note that, in the present embodiment, as the switches 22 and 23, voltage control type semiconductor switching elements, more specifically, IGBTs (insulated gate bipolar transistor) are used. Each of the switches 22 and 23 is connected with a free wheel diode 24 in antiparallel.

The control apparatus 30 generates operation signals based on detection values of phase current sensors, which detect currents flowing to phases of the motor section 10, and a rotation angle sensor, which detects a rotation angle of the motor section 10, and outputs the generated operation signals to the switches. Note that the operation signals for the upper arm switches and the operation signals for the corresponding lower arm switches are complementary to each other. That is, the upper arm switches 22a, 22b, and 22c and the corresponding lower arm switches 23a, 23b, and 23c are alternately turned on. As a result, sinusoidal voltages whose phases are displaced 120 electrical degrees with respect to each other are applied to the phases of the motor section 10, whereby the sinusoidal currents whose phases are displaced 120 electrical degrees with respect to each other flow to the phases of the motor section 10.

In ISG 100, a short circuit abnormality may occur in the motor section 10 and the inverter 20. When an abnormality occurs, there is a concern that an overcurrent may be generated due to a through current of a switching element. Specifically, for example, when one switching element is fixed in an on state in the inverter 20, if the ISG 100 is in an operating state during power running or power generation, a pair of the upper arm switch and the lower arm switch (e.g. 22a and 23a) is simultaneously turned on. Thereby a short circuit is caused, whereby an overcurrent flows to the switches.

Thus, a protection process for the ISG 100 is performed. Specifically, the control apparatus 30 determines whether or not the battery voltage Vb has decreased based on a detection value of the voltage sensor 21, and performs the protection process by using the switches 22 and 23 of the inverter 20. In the present embodiment, if the battery voltage Vb becomes low (e.g. voltage lower than 7.5 V), the control apparatus 30 interrupts a current flow to the inverter 20. That is, the control apparatus 30 turns off all the switches 22 and 23 to interrupt a current flow to the inverter 20.

In addition, when a current flow to the inverter 20 is interrupted, even if a short circuit abnormality has occurred in the inverter 20, the battery voltage Vb returns to an original normal value. Thus, the control apparatus 30 releases the interruption of a current flow to the inverter 20 based on the fact that the battery voltage Vb has returned to the normal value. Even in this case, when the voltage has decreased due to short circuit abnormalities in the motor section 10 and the inverter 20, an interruption of a current flow to the inverter 20 and a release of the interruption are repeatedly performed. Thus, the control apparatus 30 determines whether or not the release of the interruption of a current flow to the inverter 20 (i.e. cancellation of the protection process) is proper based on the number of the interruptions of a current flow and the releases thereof (the number of performances). That is, the control apparatus 30 determines whether or not the release of the interruption of a current flow is allowed based on the number of the interruptions and the releases thereof.

When a decrease in voltage is caused, it may be caused due to the ISG 100 or another factor. The factors other than the ISG include voltage fluctuation caused by the driving of electric loads having large electric power consumption, such as the starter 42 and the electric power steering system 43, and a so-called instantaneous interruption that temporarily interrupts electrical power supplied from the battery 40.

In the present embodiment, the interruption of a current flow to the inverter 20 is released (that is, the protection process is cancelled) depending on whether or not the decrease in voltage is caused due to the ISG 100 or another factor. Thereby, the protection process is prevented from being unnecessarily performed though the decrease in voltage is not caused due to the ISG 100. Specifically, when the decrease in voltage is caused due to a factor other than the ISG, the control apparatus 30 determines whether the interruption of a current flow is allowed based on the number of the interruptions while limiting the counting of the number of the interruptions of a current flow. Specifically, in the present embodiment, when the decrease in voltage is caused, the control apparatus 30 determines whether the ISG 100 is in an operating state of power generation or power running. If not in an operating state, the control apparatus 30 determines that the decrease in voltage is caused due to a factor other than the ISG.

Hereinafter, a protection control process performed by the control apparatus 30 will be described with reference to the flowchart in FIG. 2. This process is repeatedly performed at predetermined intervals (e.g. 10 ms) by the control apparatus 30.

First, in step S11, the control apparatus 30 determines whether or not the protection process for the ISG 100 is in an off state, that is, whether or not a current flow to the inverter 20 is interrupted. In a normal state, a positive determination is made in step S11, and the present process proceeds to step S12. In succeeding step S12, the control apparatus 30 determines whether or not the battery voltage Vb is less than a threshold value Vth1 (first threshold value). The threshold value Vth1 is set to detect a low voltage. For example, the threshold value Vth1 is set to a value lower than a system normal voltage. In the present embodiment, the threshold value Vth1 is set to 7.5 V. In step S12, if the control apparatus 30 determines that the battery voltage Vb is the threshold value Vth1 or more, the present process ends.

In contrast, in step S12, if the control apparatus 30 determines that the battery voltage Vb is lower than the threshold value Vth1, that is, if the decrease in voltage is detected, in step S13, the control apparatus 30 makes the protection process for the ISG 100 an on state. That is, the control apparatus 30 turns off all the switches 22 and 23 to interrupt a current flow to the inverter 20. Step S12 corresponds to a first determination section, and step S13 corresponds to a current flow interruption section.

Next, in a state where the protection process for the ISG 100 is being performed (step S11: NO), the present process proceeds to step S14, in which the control apparatus 30 determines whether or not the battery voltage Vb is more than a threshold value Vth2 (second threshold value). The threshold value Vth2 is the lowest voltage by which operation of the electrical load 41 is ensured, and can be set, for example, in accordance with the requirements of ISO. In the present embodiment, the threshold value Vth2 is set to a value larger than the threshold value Vth1. For example, the threshold value Vth2 is set to 8 V. In step S14, if the control apparatus 30 determines that the battery voltage Vb is the threshold value Vth2 or less, the present process ends, that is, the protection process for the ISG is continued.

In contrast, in step S14, if the control apparatus 30 determines that the battery voltage Vb is larger than the threshold value Vth2, the present process proceeds to step S15, in which the control apparatus 30 determines whether the ISG 100 has been in one of an operating state of power running and an operating state of power generation when the voltage has decreased. If the ISG 100 is in an operating state, it can be considered that a short-circuit abnormality has occurred due to a failure of any of the switches of the inverter 20 caused when being turned on. In contrast, if the ISG 100 is in a non-operating state, it can be considered that a short-circuit abnormality has not occurred even if a failure of any of the switches of the inverter 20 is caused when being turned on.

In this case, if the ISG 100 has been in an operating state, the present process proceeds to step S16, in which the control apparatus 30 counts the number of the interruptions of a current flow. Then, in step S17, the control apparatus 30 determines whether or not the number of the interruptions (the number of performances) is smaller than the predetermined number N. If determining that the number of the interruptions is smaller than the predetermined number N, the control apparatus 30 allows the release of the interruption of a current flow. Then, in step S18, the control apparatus 30 makes the protection process for the ISG 100 an off state. In contrast, in step S17, if the control apparatus 30 determines that the number of the interruptions is the predetermined number N or more, the present process ends. That is, the protection process for the ISG 100 is continued. In the present embodiment, the number of the interruptions of a current flow is reset at every drive cycle (on/off of the ignition switch).

The predetermined number N is set to the number so that, for example, an overcurrent is allowed to be generated due to a short-circuit failure of the ISG 100. It is noted that providing a threshold value of the number of the interruptions of a current flow can prevent an overcurrent from repeatedly flowing to the inverter 20 when a short-circuit failure of the ISG 100 is caused. Step S17 corresponds to a third determination section, and step S18 corresponds to an interruption releasing section.

In step S15, if the control apparatus 30 determines that the ISG 100 is not in an operating state, the step (step S16) of counting the number of the interruptions of a current flow is skipped, that is, the counting is limited. In this case, it is determined that the decrease in voltage is caused due to a factor other than the ISG, whereby redundant counting is prevented. As a result, in the succeeding step S17, a proper determination can be made based on the counting.

During starter cranking, which is one of the factors of the decrease in voltage other than the ISG, battery voltage pulsates in the low voltage region. In this case, it is not preferable for stabilizing the system that the protection process for the ISG 100 is performed every time when a low voltage is detected, and that the protection process for the ISG 100 is released every time when voltage increases. Hence, it is desirable that unnecessary repetitions of the protection process for the ISG 100 and the cancellation thereof are reduced as much as possible. Thus, in the present embodiment, the protection process is cancelled on condition that voltage fluctuation has been stabilized. Specifically, for example, the condition is that an increase in voltage has continued for a predetermined time period T1.

Figure 2:
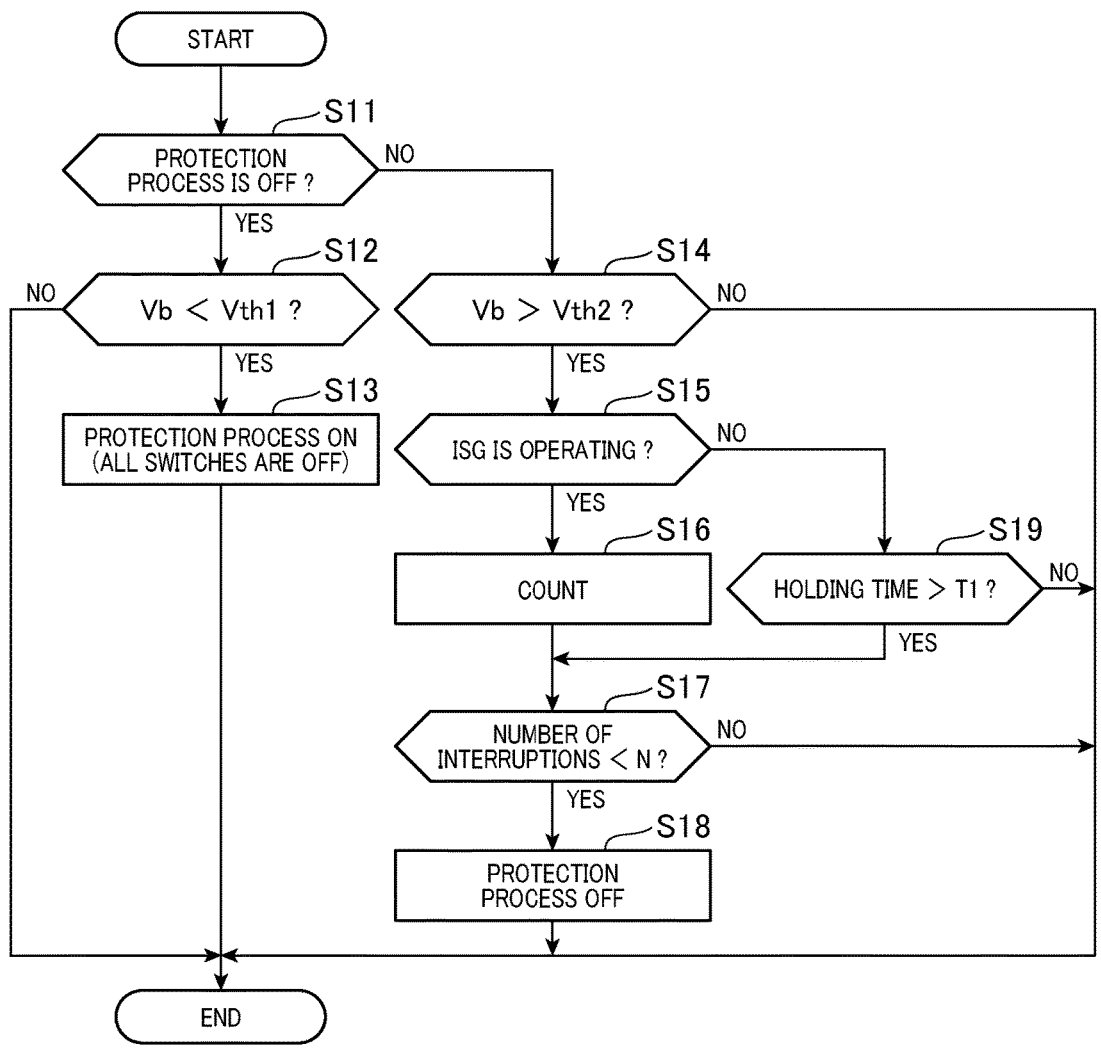
FIG. 2 is a flowchart of a protection control process performed by an ISG.

In step S15 of FIG. 2, if the control apparatus 30 determines that the ISG 100 is not in an operating state, the present process proceeds to step S19. In step S19, the control apparatus 30 determines whether or not a holding time, during which the battery voltage Vb is larger than the threshold value Vth2, is longer than the predetermined time period T1. If a negative determination is made in step S19, the present process ends. If a positive determination is made in step S19, the process proceeds to step S17, and the control apparatus 30 performs the processes of steps S17 and S18 as described above.

Figure 3:
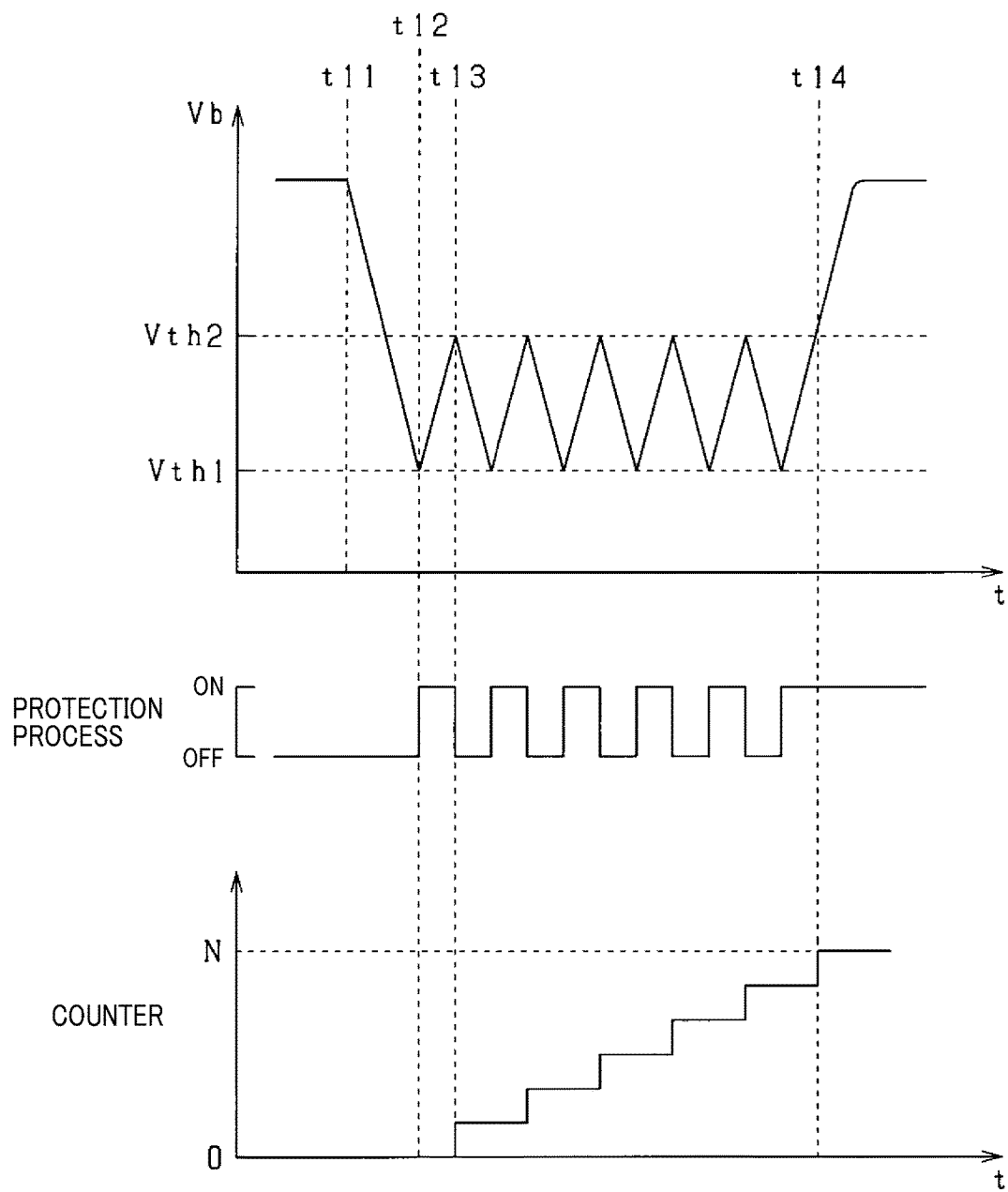
FIG. 3 is a timing diagram illustrating control performed when the ISG has failed.
Figure 4:
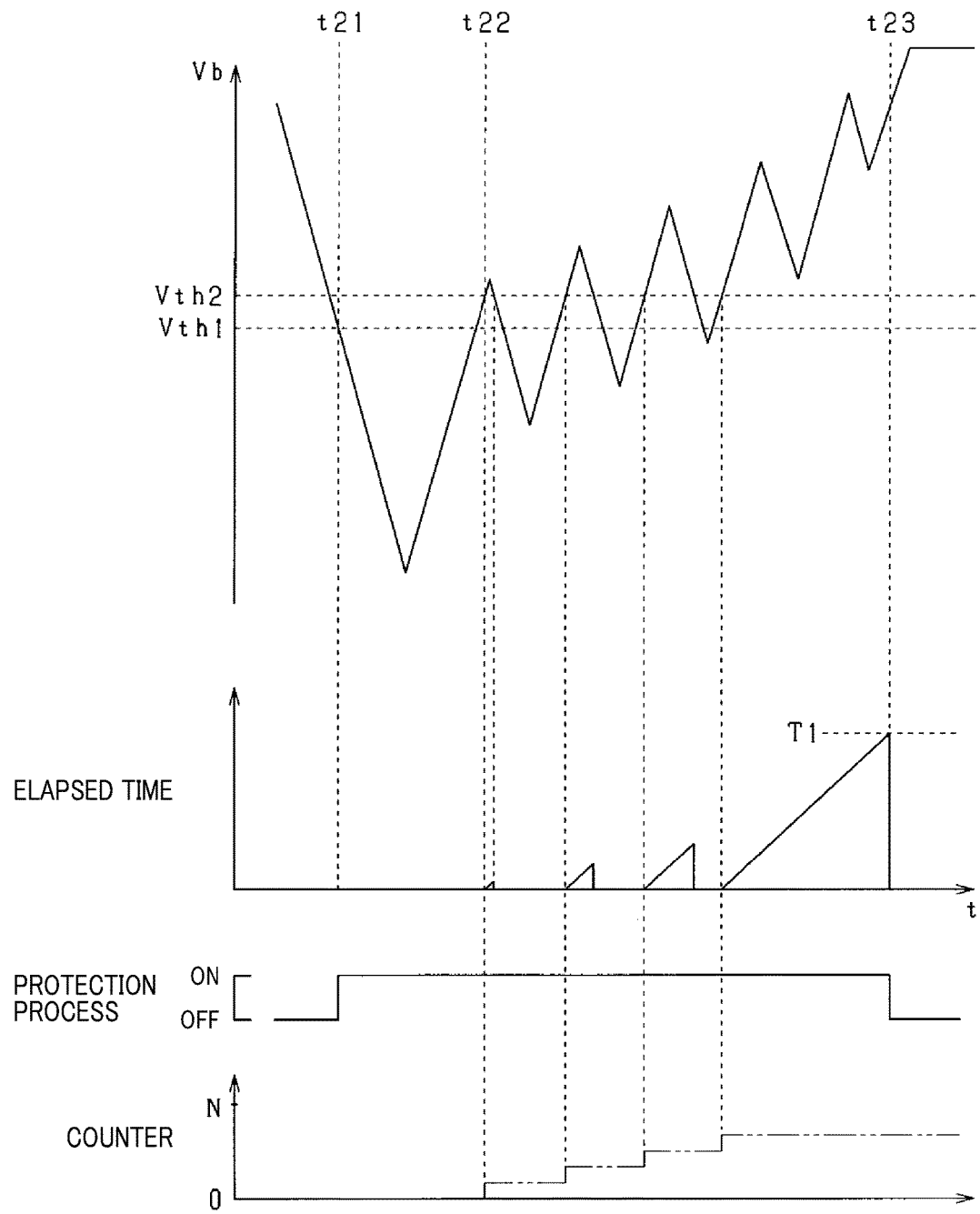
FIG. 4 is a timing diagram illustrating control performed at the time of starter cranking.

The predetermined time period T1 is set to a time period, for example, longer than a voltage fluctuation period at the start of the starter. Specifically, the predetermined time period T1 is set so as to be twice as long as a voltage fluctuation period determined by a cranking rotation speed. The voltage fluctuation period at the start of the starter is set to 0.5 s in accordance with the requirements of ISO or the like. In the present embodiment, the predetermined time period T1 is set to, for example, 1 s. According to this configuration, the protection process for the ISG 100 is continued until it can be determined that the voltage fluctuation during cranking has been stabilized. When the voltage fluctuation is stabilized, the protection process is cancelled. Thereby, unnecessary repetitions of the protection process for the ISG 100 and the cancellation thereof can be reduced Next, the above protection control process will be specifically described with reference to timing diagrams of FIG. 3 and FIG. 4. FIG. 3 illustrates a case where the decrease in voltage is caused by a short circuit abnormality of the inverter 20 while the ISG is operating. FIG. 4 illustrates a case where the decrease in voltage is caused by starter cranking while the ISG is not operating.

In FIG. 3, at timing t11, the battery voltage Vb starts decreasing due to the occurrence of an abnormality. If the battery voltage Vb falls below the threshold value Vth1 at timing t12, the protection process is started. According to the protection process, the battery voltage Vb increases. If the battery voltage Vb reaches the threshold value Vth2 at timing t13, the number of the interruptions of a current flow is counted, and then the protection process is cancelled. Thereafter, the battery voltage Vb repeatedly decreases and re-increases. According to the voltage fluctuation, every time when the protection process is performed, the number of the interruptions is counted.

At timing t14, if the number of the interruptions reaches the predetermined number N, thereafter, the protection process is not cancelled, and the inverter 20 is maintained in a state in which a current flow is interrupted. Thereafter, the battery voltage Vb returns to a normal voltage state.

Meanwhile, in FIG. 4, if the decrease in voltage is caused due to starter cranking, and the battery voltage Vb falls below the threshold value Vth1 at timing t21, the protection process for the ISG 100 is started. Thereafter, although the battery voltage Vb becomes larger than the threshold value Vth2 at timing t22, the number of the interruptions is kept without being counted on condition that the ISG is operating. In addition, in a state where the battery voltage Vb becomes larger than the threshold value Vth2, the holding time is measured. Thereafter, although the battery voltage Vb gradually increases while repeatedly decreasing and increasing, the number of the interruptions is not counted as indicated by broken lines in FIG. 4 and is kept without being counted. That is, the counting of the number of the interruptions is limited.

Then, at timing t23, if the holding time becomes longer than the predetermined time period T1, the protection process is cancelled. In this case, between timing t21 and timing t23, the protection process for the ISG 100 is continuously performed.

As described above, the counting of the number of the interruptions of a current flow is limited on condition that the ISG 100 is in a non-operating state. Thus, although the decrease in voltage has caused due to a factor other than the ISG, the operation of the ISG 100 is prevented from being unnecessarily in a stopped state.

In FIG. 2, the process in step S19 may be omitted. In this case, if a negative determination is made in step S15, the present process skips step S16 and proceeds to step S17. According to this configuration, in FIG. 4, every time when the battery voltage Vb reaches the threshold value Vth2, the protection process is cancelled. However, as in the above case, the counting of the number of the interruptions of a current flow is limited on condition that the ISG 100 is in a non-operating state. Thus, although the decrease in voltage has been caused due to a factor other than the ISG 100, the operation of the ISG 100 is prevented from being unnecessarily in a stopped.

According to the present embodiment described above, the following advantageous effects can be provided.

In the above configuration, it is determined whether the decrease in voltage is caused due to the ISG 100 or a factor other than the ISG. If the decrease in voltage is caused due to a factor other than the ISG, it is determined whether the release of the interruption of a current flow is allowed based on the number of the interruptions while limiting the counting of the number of the interruptions. Thereby, if the decrease in voltage is caused due to a factor other than the ISG 100, the counting of the number of the interruptions is limited. In contrast, if the decrease in voltage is caused due to the ISG 100, the counting is not limited, and the number of the interruptions is counted. As a result, depending on whether the decrease in the power-supply voltage is caused due to the ISG 100 or a factor other than the ISG 100, the determination that the release of the interruption of a current flow is allowed is properly made. Thus, when low voltage is generated, the ISG 100 can be properly operated and protected.

Under the condition that the ISG 100 is not operating, a current does not flow to the inverter 20, and the switches 22 and 23 of the upper and lower arms of the inverter 20 are in off states. Hence, it can be considered that the decrease in voltage caused in a state where the ISG 100 is not operating is caused due to a factor other than the ISG. In this regard, in the above configuration, if the ISG 100 is not operating when the decrease in voltage is caused, the decrease in voltage is assumed (determined) to be caused due to a factor other than the ISG, whereby the counting is limited. Thus, the factor causing the decrease in voltage can be determined, whereby the ISG 100 can be properly protected.

When the decrease in voltage is caused due to a factor other than the ISG, the power-supply voltage may pulsate in the low voltage region for a while due to, for example, operation of an electrical system having large power consumption. In the above configuration, conditions for releasing the interruption of a current flow include, in addition to the fact that the power-supply voltage has increased, the fact that the increase in the power-supply voltage has continued for a predetermined time period. In this case, a current flow is interrupted between the time when the decrease in voltage is detected and the time when the voltage fluctuation is stabilized. After the voltage fluctuation is stabilized, the interruption of a current flow is released. Thus, the interruption of a current flow and the release of the interruption are prevented from being repeated due to the pulsation of the power-supply voltage, whereby the system can be stabilized.

When starter cranking is performed, the power-supply voltage fluctuates such that the power-supply voltage greatly decreases from a normal voltage level, and pulsates in the low voltage region for a while, and then the power-supply voltage is restored to the normal voltage level. The decrease in voltage due to starter cranking is desirably determined apart from the factor of the ISG 100. According to the above configuration, the counting during starter cranking is limited. Thus, even when the power-supply voltage pulsates in the low voltage region during starter cranking, the determination that the release of the interruption of a current flow is allowed is properly made.

(Second Embodiment)

Next, the second embodiment will be described focusing on differences from the first embodiment. In the present embodiment, instead of limiting the counting of the number of the interruptions of a current flow based on the operating state of the ISG 100, the counting of the number of the interruptions is limited based on a period (cycle) of occurrence of decrease and increase in the battery voltage Vb (i.e. repetition period (cycle period) of the interruption of a current flow).

When the decrease in voltage is caused due to a factor other than the ISG (e.g. during starter cranking in FIG. 4), voltage fluctuation occurs depending on the voltage fluctuation in the electrical load 41 other than the ISG regardless of the interruption of a current flow and the release thereof. Hence, if the voltage of the electrical load 41 is stabilized, the voltage fluctuation is eliminated. In contrast, when the decrease in voltage is caused due to the ISG 100 (e.g. failure in FIG. 3), voltage fluctuation occurs depending on the performance of the interruption of a current flow and the release thereof. Hence, as long as the interruption of a current flow and the release thereof are performed, a voltage fluctuation repeatedly occurs. From the above, depending on whether the decrease in voltage is caused due to ISG 100 or a factor other than the ISG, the period of occurrence of decrease in the battery voltage Vb and a return to the battery voltage Vb changes, whereby the repetition frequency thereof changes in time-series.

Hence, in the present embodiment, it is determined whether the decrease in the battery voltage Vb is caused due to the ISG 100 or a factor other than the ISG based on the period of occurrence of decrease in the battery voltage Vb and a return to the battery voltage Vb to limit the counting. In this case, if the period of occurrence is longer than a predetermined period C1, it is determined that the decrease in the battery voltage Vb is caused due to a factor other than the ISG to limit the counting. It is noted that the predetermined period C1 is set based on, for example, the period of voltage fluctuation during starter cranking.

Figure 5:
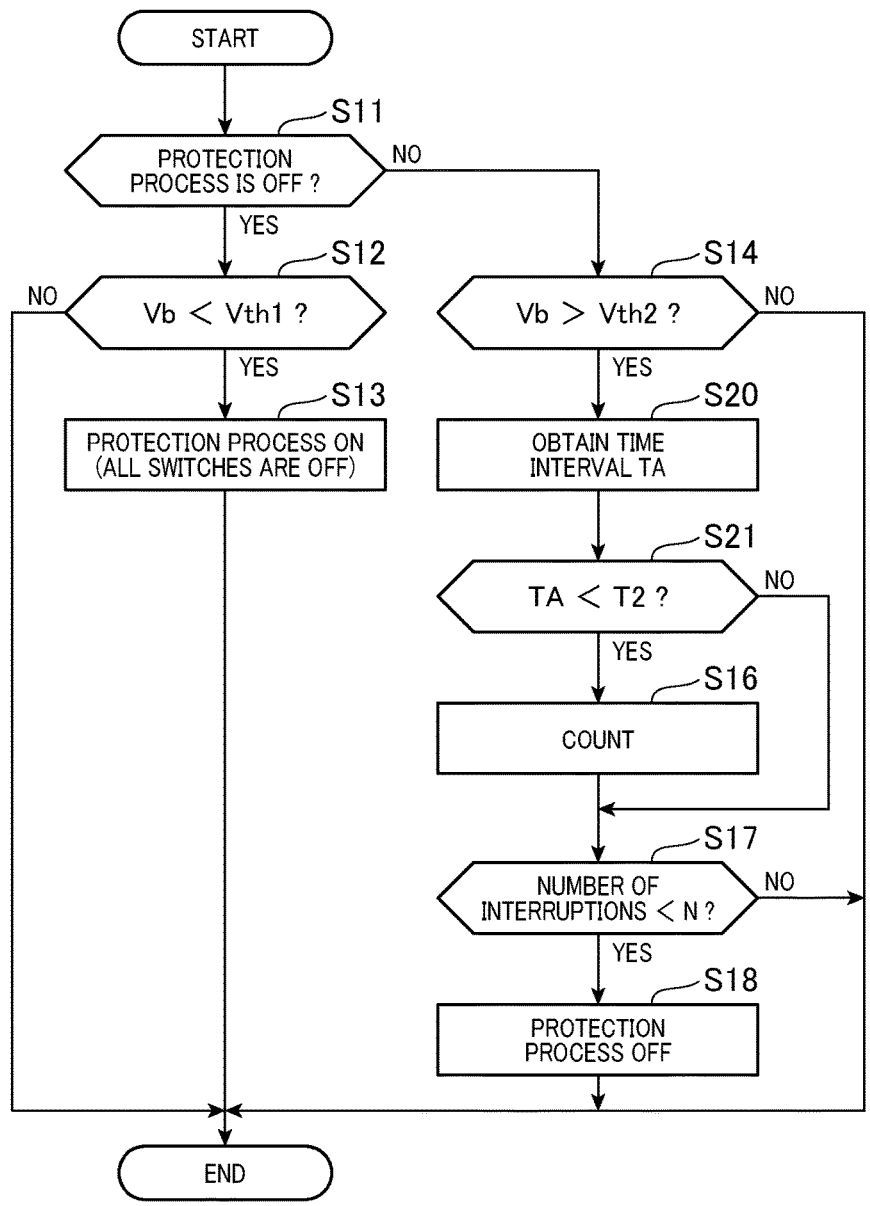
FIG. 5 is a flowchart of a protection control process for the ISG according to a second embodiment.

FIG. 5 is a flowchart of a protection control process according to the present embodiment. This process is performed by the control apparatus 30 instead of the above process in FIG. 2. Hereinafter, only the differences from FIG. 2 will be described.

In FIG. 5, in a state where the protection process of the ISG 100 is being performed, and the battery voltage Vb is larger than the threshold value Vth2 (step S11: NO, N14: YES), in step S20, the control apparatus 30 obtains a time interval TA between the time when the battery voltage Vb decreases below the threshold value Vth1 and the time when the battery voltage Vb increases above the threshold value Vth2. Next, in step S21, the control apparatus 30 determines whether or not the time interval TA is smaller than a predetermined value T2. In this case, if the time interval TA is smaller than the predetermined value T2, the present process proceeds to step S16, in which the control apparatus 30 counts the number of the interruptions of a current flow. If the time interval TA is the predetermined value T2 or more, the present process skips the step of counting the number of the interruptions (step S16), that is, the counting is limited.

The predetermined value T2 may be set to a value that is larger than a voltage fluctuation period obtained when increase and decrease in the battery voltage Vb are repeated when a short circuit abnormality has occurred in the inverter 20 shown in FIG. 3 and that is smaller than a voltage fluctuation period set based on a cranking rotation speed. The predetermined value T2 may be set based on a voltage fluctuation period obtained when a short circuit abnormality has occurred or a voltage fluctuation period during starter cranking.

FIG. 6 shows a timing diagram of the protection control process in the above case. In FIG. 6, if the decrease in voltage is caused due to starter cranking, and the battery voltage Vb falls below the threshold value Vth1 at timing t31, the protection process for the ISG 100 starts. Thereafter, although the battery voltage Vb becomes larger than the threshold value Vth2 at timing t32, the number of the interruptions is kept without being counted on condition that the time interval TA (time period between t31 and t32) is larger than the predetermined value T2. Thereafter, similar operation is performed when voltage fluctuation occurs. Hence, the number of the interruptions is prevented from becoming the predetermined number N or more, that is, the protection process is prevented from not being cancelled.

Accordingly, although the decrease in voltage has been caused due to a factor other than the ISG, the operation of the ISG 100 is prevented from being unnecessarily in a stopped state.

Alternatively, at least one of the number of determinations that the battery voltage Vb has decreased below the threshold value Vth1 and the number of determinations that the battery voltage Vb has increased above the threshold value Vth2 may be obtained during a predetermined fixed time period. If the number of determinations is smaller than a predetermined value, the counting of the number of the interruptions may be limited, assuming (determining) that the period of occurrence of decrease and increase in the battery voltage Vb is a predetermined period or more.

The present invention is not limited to the above embodiment, but may be implemented as below.

In the above embodiment, the threshold value Vth1 and the threshold value Vth2 for the battery 40 are set so as to be different from each other, but may be so as to be the same.

The step of counting the number of the interruptions of a current flow (step S16) may be performed after the step of the protection process (step S13). In this case, after the protection process is performed, for example, the number of the interruptions is counted.

In the above embodiment, when the decrease in the power-supply voltage is caused due to a factor other than the ISG, the counting is not performed, that is, the counting is stopped. Alternatively, for example, only when it is determined that the decrease in the power-supply voltage is caused due to a factor other than the ISG, the upper limit of the number of the interruptions may be provided to stop the counting if the number of the interruptions reaches the upper limit.

In the above embodiment, the number of the interruptions of a current flow is set so as to be reset at every drive cycle (on/off of the ignition switch). However, a function may be provided for performing cumulative counting regardless of on/off of the ignition switch. In this case, the number of times that the ISG 100 detects low voltage can be obtained, which becomes advantageous when the vehicle is checked. Alternatively, when the interruption of a current flow is not allowed to be released, the interruption of a current flow may be thereafter continued at drive cycles.

In the above embodiment, to interrupt a current flow to the inverter 20, the control apparatus 30 turns off all the switches 22 and 23 of the inverter 20. However, other means may be used. For example, an additional switch may be provided on a current flow path leading to the battery 40 in the inverter 20 so that the control apparatus 30 turns off the switch based on the determination result of the decrease in voltage.

The switching elements configuring the inverter 20 are not limited to IGBTs, but may be power transistors such as MOSFETs. Alternatively, the switching elements configuring the inverter 20 are not limited to the voltage control type, but may be current control type such as bipolar transistors.

The battery 40 is not limited to a 12V battery, but may be a higher-voltage battery.

It will be appreciated that the present invention is not limited to the configurations described above, but any and all modifications, variations or equivalents, which may occur to those who are skilled in the art, should be considered to fall within the scope of the present invention.

Hereinafter, an aspect of the above-described embodiments will be summarized.

As an aspect of the embodiment, a control apparatus (30) for an electric rotating machine (100) is provided. The apparatus is applied to a power-supply system including an electrical load (41) connected to a current flow path leading to a power supply unit (40) and the electric rotating machine having an inverter (20) connected to the current flow path and a motor section (10). The apparatus includes: a first determination section that determines whether a power-supply voltage, which is a voltage of the power supply unit, has decreased below a first threshold value; a current flow interruption section that interrupts a current flow to the inverter if the first determination section determines that the power-supply voltage has decreased below the first threshold value; a second determination section that determines whether or not the power-supply voltage has increased above a second threshold value after the current flow interruption section interrupts the current flow; an interruption releasing section that releases the interruption based on the fact that the power-supply voltage has increased above the second threshold value; a count section that counts the number of the interruptions by the current flow interruption section; a limiting section that determines whether the decrease in the power-supply voltage is caused by a first factor of the electric rotating machine or a second factor other than the first factor, and limits the counting by the count section if the decrease in the power-supply voltage is caused by the second factor; and a third determination section that determines whether or not the interruption is allowed to be released by the interruption releasing section based on the number of the interruptions.

When the decrease in the power-supply voltage is caused due to an electric rotating machine, it can be considered that an abnormal state causing the decrease in the voltage, for example, a state of a failure of the switching element of the inverter caused when being turned on occurs continuously. Hence, an interruption of a current flow to the inverter and a release of the interruption are repeatedly performed. Thus, it is desirable to determine whether or not the release of the interruption of a current flow to the inverter (i.e. cancellation of the protection process) is proper in the electric rotating machine based on the number of the interruptions.

In addition, when the decrease in the power-supply voltage is caused, it can be considered that the decrease in the power-supply voltage is caused due to the electric rotating machine or due to a factor other than the electric rotating machine. Hence, it is desirable to limit the operation of the electric rotating machine depending on a first factor due to the electric rotating machine or a second factor other than the first factor. That is, if the decrease in the power-supply voltage is caused by the first factor, it is required to interrupt a current flow to the inverter (i.e. the protection process is performed). If the decrease in the power-supply voltage is caused by the second factor, it is not required to interrupt a current flow to the inverter, but it is desirable that the release of the interruption of a current flow to the inverter is allowed.

In this regard, in the above configuration, it is determined whether the decrease in voltage is caused by a first factor or a second factor. If the decrease in voltage is caused by the second factor, the interruption of a current flow is allowed to be released based on the number of the interruptions while limiting the counting of interruptions of a current flow. Thereby, if the decrease in voltage is caused by the second factor, the counting of the number of the interruptions is limited. In contrast, if the decrease in voltage is caused by the first factor, the counting is not limited, and the number of the interruptions is counted. As a result, depending on whether the decrease in the power-supply voltage is caused by the first factor or the second factor, the determination that the release of the interruption of a current flow is allowed can be properly made. Thus, when low voltage is generated, the electric rotating machine can be properly operated and protected.

When the electric rotating machine is not in an operating state, the limiting section determines that the decrease in the power-supply voltage is caused by the second factor and limits the counting by the count section.

Under the condition that the electric rotating machine is not operating, a current does not flow to the inverter, and the switches of the upper and lower arms of the inverter are in off states. Hence, it can be considered that the decrease in voltage caused in a state where the electric rotating machine is not operating is caused due to a factor other than the electric rotating machine (second factor). In this regard, in the above configuration, if the electric rotating machine is not operating when the decrease in voltage is caused, the decrease in voltage is assumed (determined) to be caused due to a factor other than the electric rotating machine, whereby the counting is limited. Thus, the factor causing the decrease in voltage can be properly determined, whereby the electric rotating machine can be properly protected.

When the electric rotating machine is not in an operating state, the interruption releasing section releases the interruption based on the fact that the power-supply voltage has increase above the second threshold and that the voltage above the second threshold has continued for a predetermined time period.

When the decrease in voltage is caused due to a factor other than the electric rotating machine, the power-supply voltage may pulsate in the low voltage region for a while due to, for example, operation of an electrical system having large power consumption. In the above configuration, conditions for releasing the interruption of a current flow include, in addition to the fact that the power-supply voltage has increased, the fact that the rise in the power-supply voltage has continued for a predetermined time period. In this case, a current flow is interrupted between the time when the decrease in voltage is detected and the time when the voltage fluctuation is stabilized. After the voltage fluctuation is stabilized, the interruption of a current flow is released. Thus, the interruption of a current flow and the release of interruption are prevented from being repeated due to the pulsation of the power-supply voltage, whereby the system can be stabilized.

If a period of occurrence of decrease and increase in the power-supply voltage is a predetermined period or more, the limiting section determines that the decrease in the power-supply voltage is caused by the second factor and limits the counting by the count section.

When an interruption of a current flow to the inverter and a release of the interruption is performed according to the decrease in the power-supply voltage, the period of decrease and increase in the power-supply voltage changes depending on whether the decrease in the voltage is caused due to the electric rotating machine or due to a factor other than the electric rotating machine (first factor or second factor). In this case, if the decrease in the voltage is caused due to the electric rotating machine, voltage fluctuation occurs depending on performance of the interruption of a current flow and the release thereof. In contrast, when the decrease in the voltage is caused due to a factor other than the electric rotating machine, voltage fluctuation occurs depending on the voltage fluctuation in an electrical load other than the electric rotating machine regardless of the interruption of a current flow and the release thereof. As a result, in the case where the decrease in voltage is caused due to a factor other than the electric rotating machine, the period of occurrence of decrease and increase in the power-supply voltage becomes longer than in the case where the decrease in voltage is caused due to the electric rotating machine.

According to the above configuration, if the period of occurrence of decrease and increase in the power-supply voltage is a predetermined period or more, the decrease in the voltage is determined to be caused by the second factor, and the counting is limited. In contrast, if the period of occurrence is shorter than the predetermined period, the decrease in the voltage is determined to be caused by the first factor, and the counting is not limited, and the number of the interruptions is counted. Thus, the determination that the release of the interruption of a current flow is allowed can be made depending on the factor, whereby the electric rotating machine can be properly operated and protected when low voltage is generated.

The control apparatus includes an obtaining section that obtains a time interval between a time when the first determination section determines that the power-supply voltage has decreased below the first threshold value and a time when the second determination section determines that the power-supply voltage has increased above the second threshold value. If the time interval is larger than a predetermined value, the limiting section limits the counting by the count section, determining that the period of occurrence of decrease and increase in the power-supply voltage is the predetermined period or more.

The time interval between the time when the power-supply voltage reaches the first threshold value and the time when the power-supply voltage reaches the second threshold value changed between the case where the decrease in voltage is caused due to the electric rotating machine and the case where the decrease in voltage is caused due to a factor other than the electric rotating machine. Thus, adding this matter can properly determine the factor causing the decrease in voltage.

The control apparatus is applied to a power-supply system including a starter as the electrical load. The second factor is starter cranking. The limiting section limits the counting when the power-supply voltage decreases due to the starter cranking.

When starter cranking is performed, the power-supply voltage pulsates such that the power-supply voltage greatly decreases from a normal voltage level, and pulsates in the low voltage region for a while, and then the power-supply voltage is restored to the normal voltage level. The decrease in voltage due to starter cranking is desirably determined apart from the first factor.

According to the above configuration, the counting during starter cranking is limited. Thus, even when the power-supply voltage pulsates in the low voltage during starter cranking, the determination that the release of the interruption of a current flow is allowed is properly made.

What is claimed is:

1. An integrated starter generator, comprising:
   an electrical load connected to a current flow path leading to a power supply;
   an electric rotating machine having an inverter connected to both the current flow path and to a motor; and
   a control apparatus configured to:
      determine whether a power-supply voltage, which is a voltage of the power supply, has decreased below a first threshold value; and
      when the power-supply voltage has decreased below the first threshold value:
         interrupt a current flow to the inverter;
         determine whether the voltage decrease is caused by the electric rotating machine or a factor other than the electric rotating machine;
         when the voltage decrease is caused by the electric rotating machine, incrementally increase a count of a number of the interruptions of the current flow to the inverter;
         when the voltage decrease is caused by the factor other than the electric rotating machine, do not incrementally increase the count of the number of the interruptions;
         determine whether or not the power-supply voltage has increased above a second threshold value after the control apparatus interrupts the current flow; and
         when the power-supply voltage has increased above the second threshold value:
            determine whether or not the count of the number of the interruptions exceeds a third threshold;
            when the count of the number of the interruptions does not exceed the third threshold, resume the current flow to the inverter; and
            when the count of the number of the interruptions exceeds the third threshold, do not resume the current flow.

2. The integrated starter generator according to claim 1, wherein the control apparatus is further configured to:
   determine whether or not the electric rotating machine is in an operating state; and
   when the electric rotating machine is not in the operating state, and the power-supply voltage has decreased below the first threshold value, determine that the voltage decrease is caused by the factor other than the electric rotating machine.

3. The integrated starter generator according to claim 2, wherein the control apparatus is further configured to:
   when the power-supply voltage has increased above the second threshold value after the control apparatus interrupts the current flow, and the electric rotating machine is not in the operating state:
      determine whether or not the power-supply voltage remains above the second threshold value for a predetermined time period; and
   when the power-supply voltage has remained above the second threshold value for the predetermined time period, resume the current flow to the inverter.

4. The integrated starter generator according to claim 1, wherein the control apparatus is further configured to:
   when the power-supply voltage has decreased below the first threshold value, and the power-supply voltage has increased above the second threshold value after the control apparatus interrupts the current flow, determine whether or not a time period between the voltage decrease and the voltage increase is a predetermined period or more; and
   when the time period is the predetermined period or more, determine that the voltage decrease is caused by the factor other than the electric rotating machine.

5. The integrated starter generator according to claim 4, wherein the control apparatus is further configured to:
   obtain a time interval between a time when it is determined that the power-supply voltage has decreased below the first threshold value and a time when it is determined that the power-supply voltage has increased above the second threshold value; and
   when the time interval is larger than a predetermined value, determine that the time period is the predetermined period or more.

6. The integrated starter generator according to claim 1, further comprising:
   a starter that is the electrical load,
   wherein the factor other than the electric rotating machine is starter cranking.

* * * * *